United States Patent
Pergolesi et al.

(10) Patent No.: US 8,570,739 B2
(45) Date of Patent: Oct. 29, 2013

(54) MODULAR POWER SUPPLY

(75) Inventors: Sauro Pergolesi, Osimo (IT); Daniele Vispi, Osimo (IT)

(73) Assignee: Roal Electronics S.p.A., Castelfidardo (IT)

( * ) Notice: Subject to any disclaimer, the term of this patent is extended or adjusted under 35 U.S.C. 154(b) by 245 days.

(21) Appl. No.: 13/278,005

(22) Filed: Oct. 20, 2011

(65) Prior Publication Data

US 2012/0099272 A1   Apr. 26, 2012

(30) Foreign Application Priority Data

Oct. 22, 2010   (IT) .............................. MI2010A1948

(51) Int. Cl.
  *H05K 7/20* (2006.01)
  *H05K 5/00* (2006.01)
(52) U.S. Cl.
  USPC ........................... 361/688; 361/752; 361/753
(58) Field of Classification Search
  None
  See application file for complete search history.

(56) References Cited

U.S. PATENT DOCUMENTS

| | | | |
|---|---|---|---|
| 5,680,294 A | 10/1997 | Stora et al. | |
| 6,046,921 A * | 4/2000 | Tracewell et al. | 363/141 |
| 6,407,910 B1 * | 6/2002 | Diaz et al. | 361/679.37 |
| 6,947,287 B1 * | 9/2005 | Zansky et al. | 361/731 |
| 7,626,356 B2 * | 12/2009 | Elgie et al. | 320/107 |
| 7,916,458 B2 * | 3/2011 | Nelson et al. | 361/623 |
| 7,948,207 B2 * | 5/2011 | Scheucher | 320/104 |
| 7,953,517 B1 * | 5/2011 | Porter et al. | 700/284 |
| 7,996,115 B2 * | 8/2011 | Nickerson et al. | 700/284 |
| 2006/0030971 A1 | 2/2006 | Nelson et al. | |
| 2006/0120001 A1 | 6/2006 | Weber et al. | |
| 2010/0036536 A1 | 2/2010 | Nelson et al. | |
| 2011/0170239 A1 | 7/2011 | Nelson et al. | |

FOREIGN PATENT DOCUMENTS

| | | |
|---|---|---|
| DE | 195 36 906 C1 | 11/1996 |
| EP | 0 735 810 A2 | 10/1996 |
| EP | 1 667 315 A2 | 6/2006 |

OTHER PUBLICATIONS

'Dell PowerEdge Rack Systems, DELL Inc., Dec. 2003, XP002663730, Retrieved from the Internet: URL:http://verinet.dk/dell_rack_system.pdf [retrieved on Nov. 17, 2011], 4 pages.

* cited by examiner

*Primary Examiner* — Boris Chervinsky
(74) *Attorney, Agent, or Firm* — Pearne & Gordon LLP

(57) ABSTRACT

A modular power supply (1) includes a primary input portion (2) operating with predetermined input parameters, and an output portion (3) comprising at least two modules (4) to be selected for modifying the power supply's output parameters. It is further provided a container (5) in which the primary input portion and the output portion are housed. The container comprises an inaccessible portion (6) adapted to house the primary input portion separated from the output portion, and a cover (7) hinged on a base structure (8) of the container for access to the output portion. The inaccessible portion of the container comprises a partition (9) disposed between the primary input portion and the output portion and provided with openings (10) for cooling the primary input and secondary portions. The openings are such disposed that access to the primary input portion is not allowed.

11 Claims, 6 Drawing Sheets

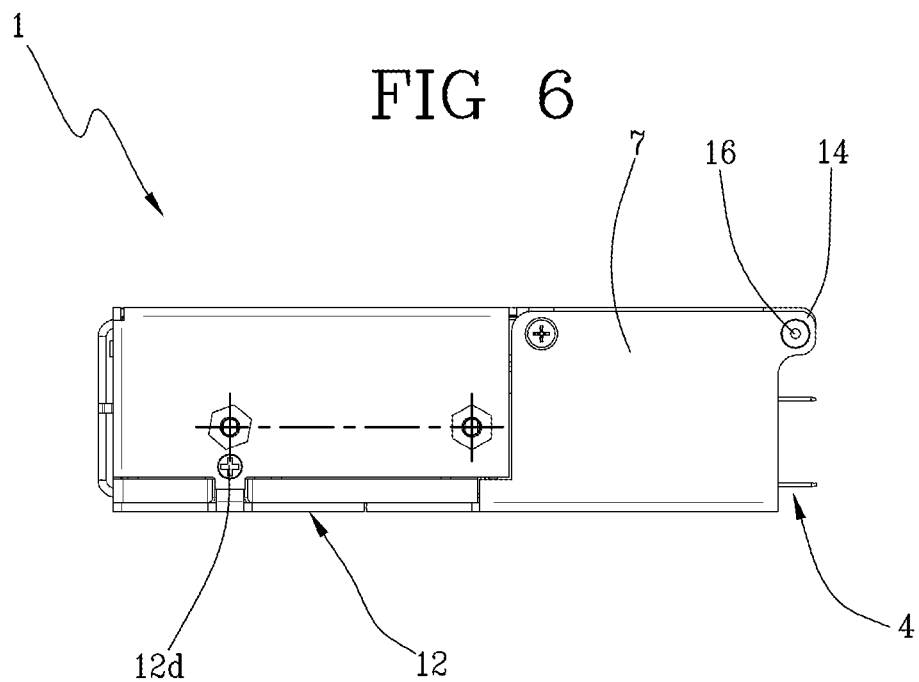
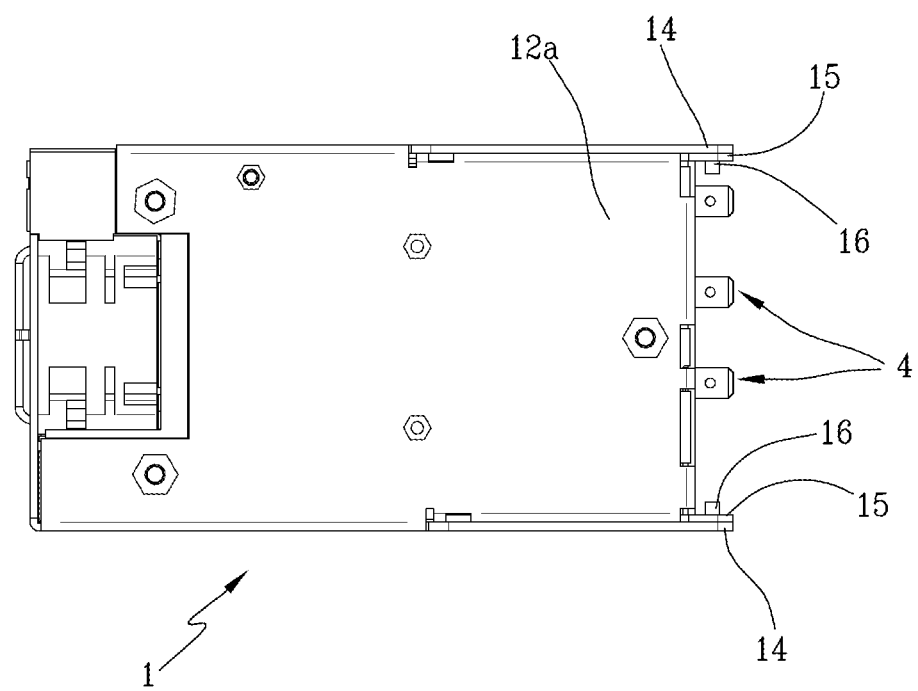

MODULAR POWER SUPPLY

FIELD OF THE INVENTION

The present invention relates to a modular power supply.

BACKGROUND OF THE INVENTION

The term "power supply" is generally used for defining an AC-DC converter. By the term "modular" it is intended a power supply that can be configured depending on the user's requirements due to the presence of two or more output modules.

While known modular power supplies allow wide flexibility in terms of output parameters, they are not such structured as to enable the user to directly configure them in a safe manner as regards risks of electrical hazard.

The Applicant has found that such limit of known power supplies is due to the fact that direct access of the user to the inside of the power supply's container would not be safe because this would directly expose said user to the primary circuit portion; in addition, manipulation of this circuit by the user would cause the requirements of the CE marking to expire, as well as of possible marks of the product by Safety Certification Bodies. The power supply's container therefore has been hitherto structured in a manner adapted to inhibit the users' access to the power supply, by adopting vandal-proof threaded connections for example.

SUMMARY OF THE INVENTION

The Applicant has perceived as a not yet solved requirement in the sector, the availability of a modular power supply that can be directly configured by the user.

In this context, the technical task underlying the present invention is to propose a modular power supply overcoming the above mentioned drawbacks of the known art and adapted to meet the requirement stated above.

In particular, it is an aim of the present invention to make available a modular power supply capable of enabling safe access to the inside of the power supply's container by the user so that the number and/or arrangement of the output modules can be modified as a function of specific output parameters.

It is a further aim of the present invention to propose a modular power supply that is of simple assembling and easy opening by the final user.

The technical task mentioned and the aims specified are substantially achieved by a modular power supply comprising the technical features set out in one or more of the appended claims. The dependent claims correspond to possible embodiments of the invention.

BRIEF DESCRIPTION OF THE DRAWINGS

Further features and advantages of this invention will become more apparent from the description given by way of non-limiting example of a preferred but not exclusive embodiment of a modular power supply, as shown in the attached drawings, in which:

FIG. 6 is a side view of the modular power supply in FIG. 1;

FIG. 7 is a view from below of the modular power supply in FIG. 1;

DETAILED DESCRIPTION OF THE PREFERRED EMBODIMENTS OF THE INVENTION

Figure 1:
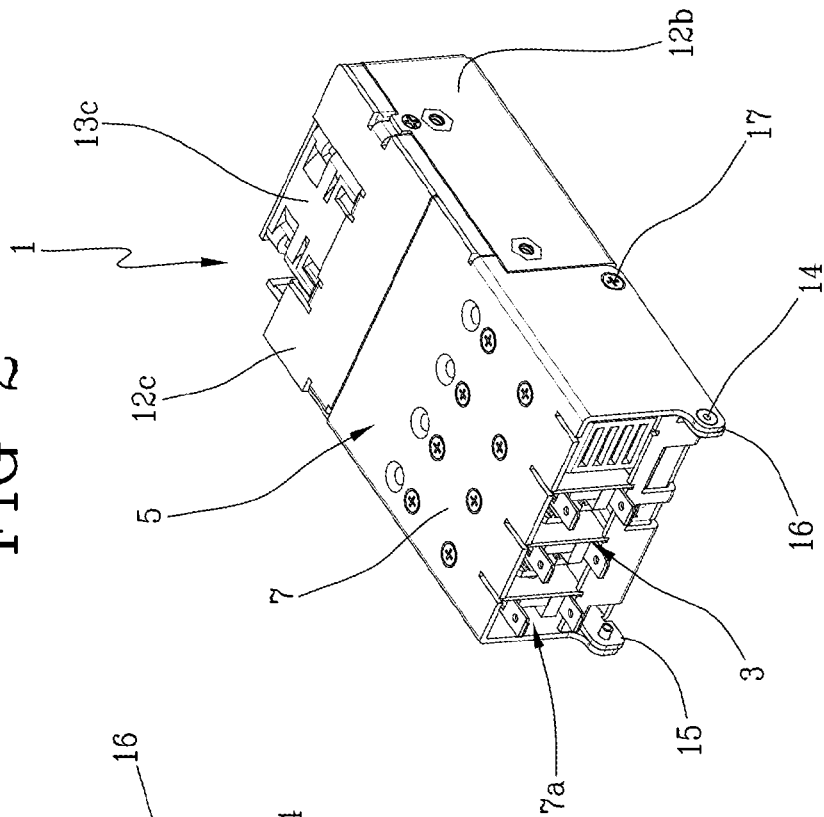
FIG. 1 is a perspective view of a modular power supply according to the present invention.
Figure 2:
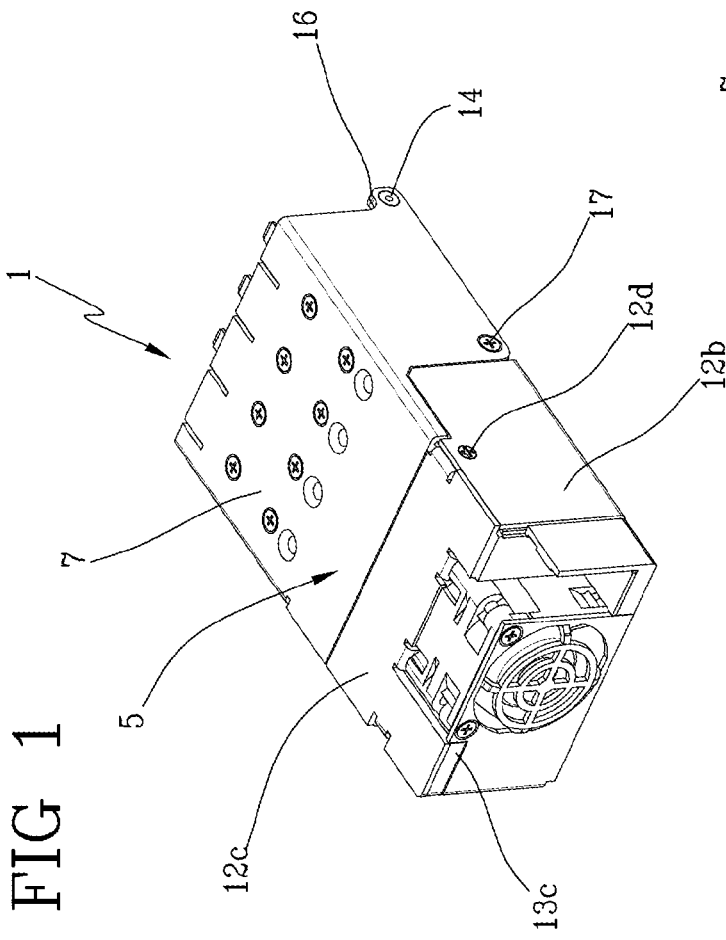
FIG. 2 is a perspective view of the modular power supply seen in FIG. 1 according to a different angle.
Figure 3:
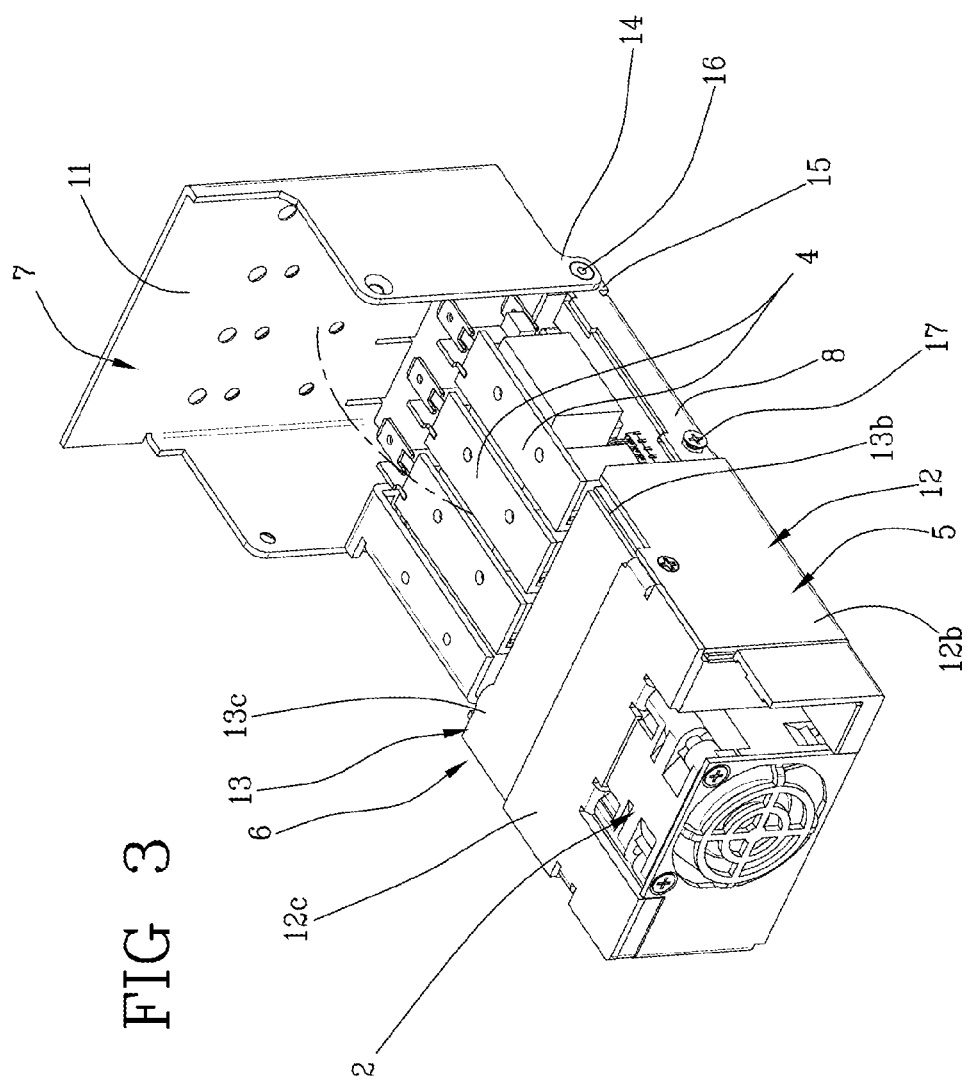
FIG. 3 shows an enlarged view of the modular power supply in FIG. 1 in a different operating condition.
Figure 5:
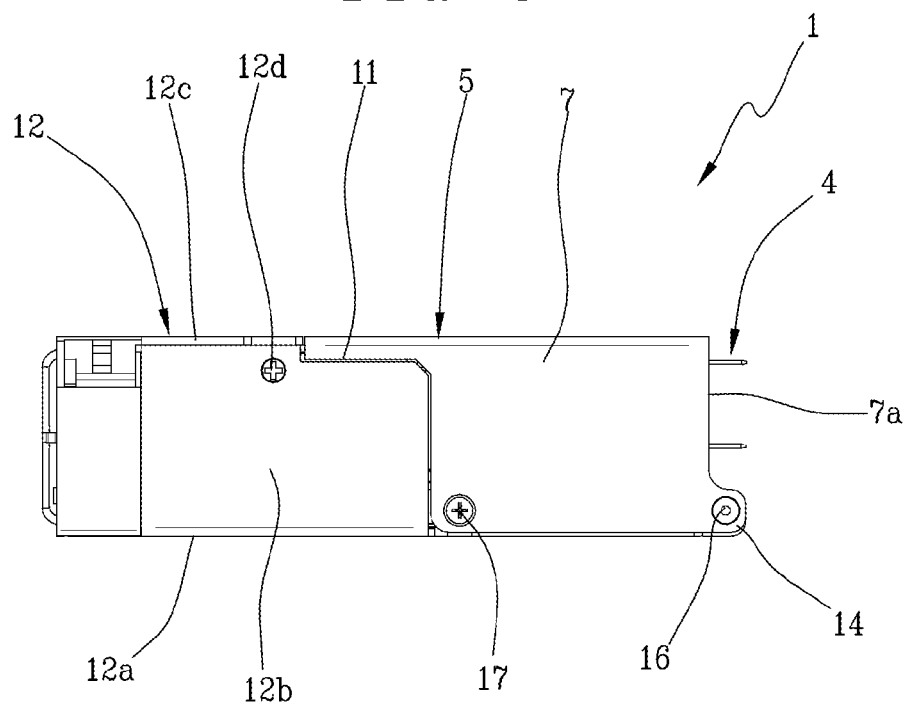
FIG. 5 shows a side view of the modular power supply in FIG. 1.
Figure 4:
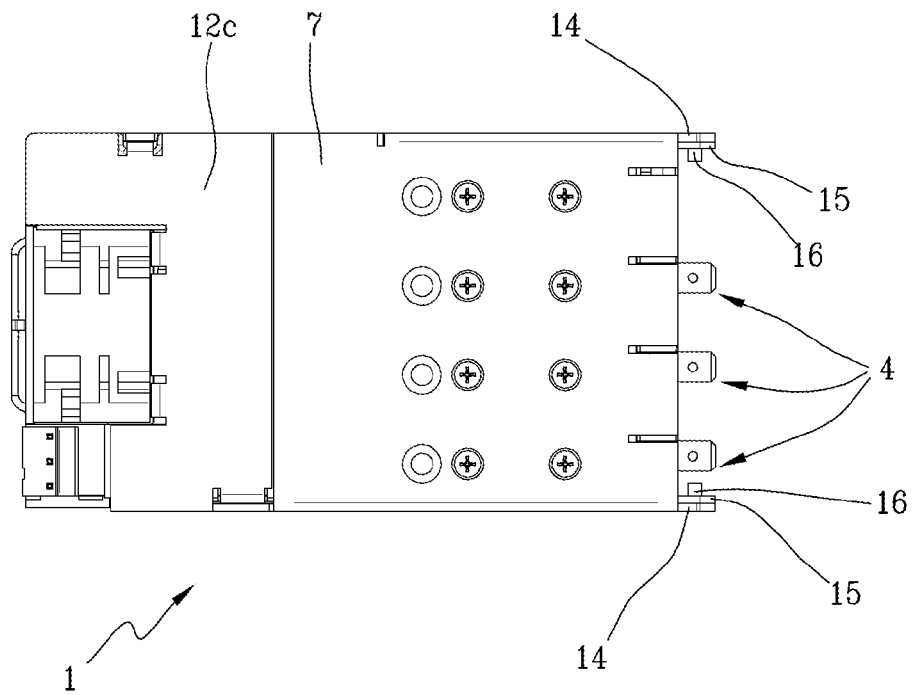
FIG. 4 is a top view of the modular power supply in FIG. 1.
Figure 8:
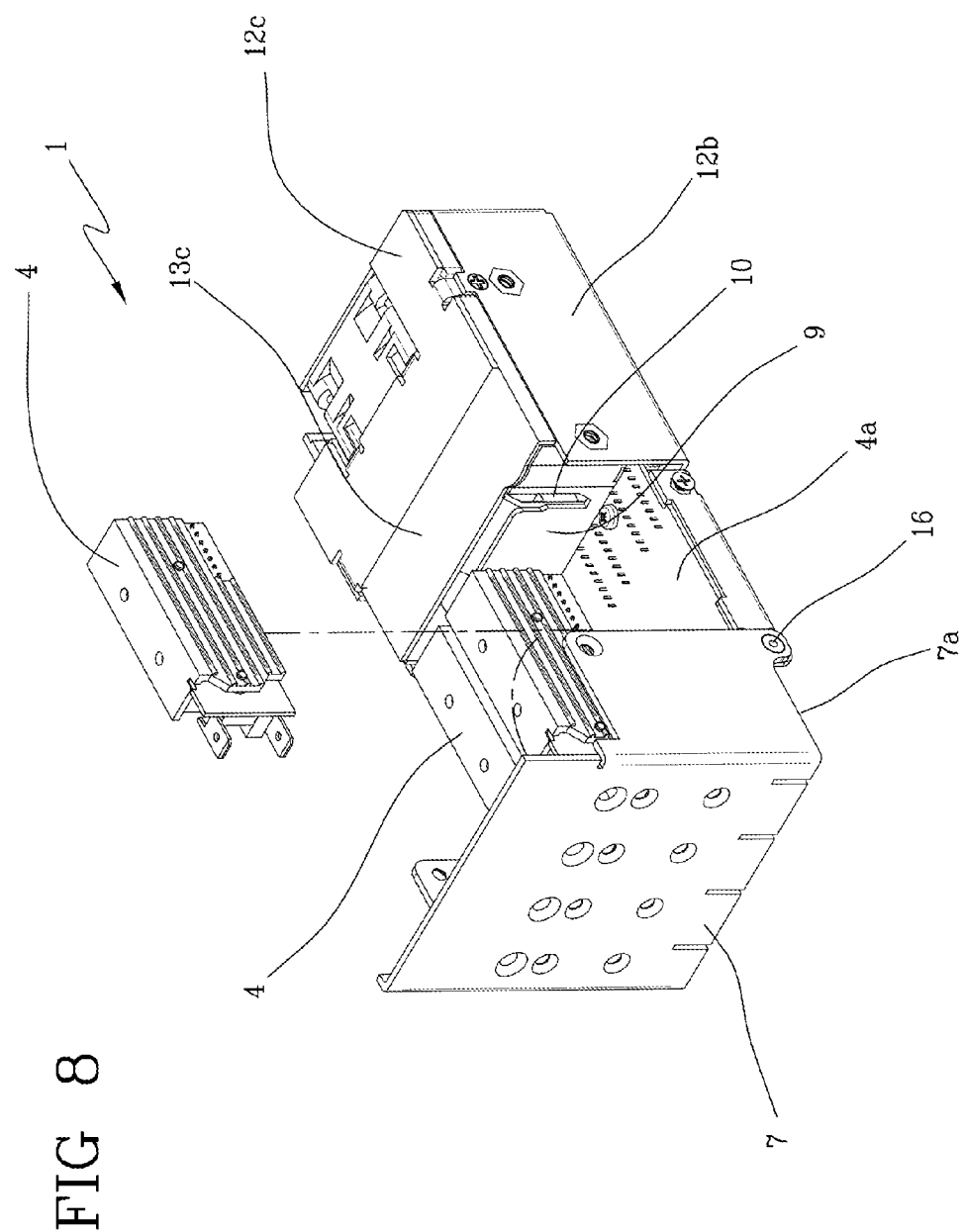
FIG. 8 is a perspective view of the modular power supply in FIG. 1 according to a different angle and a different operating condition.
Figure 9:
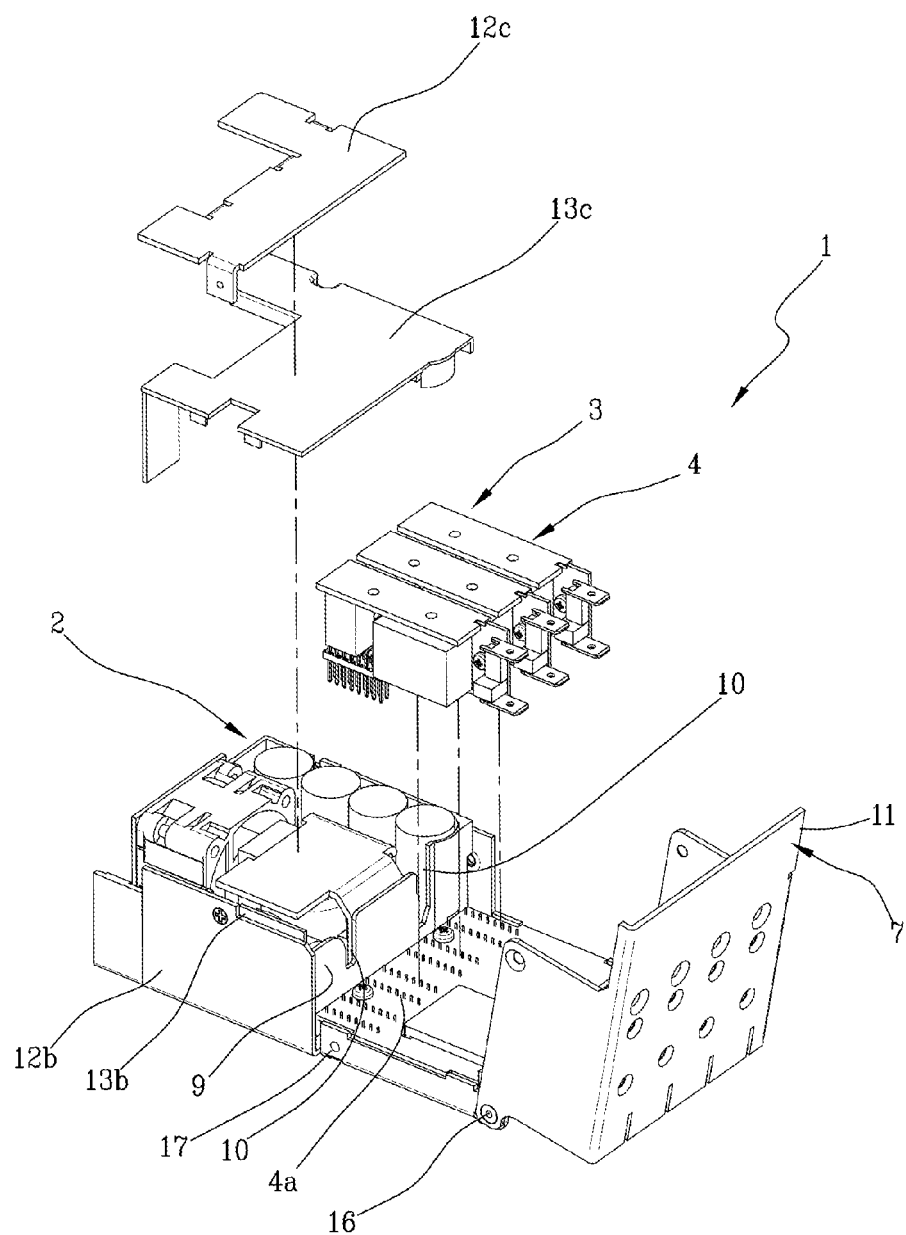
FIG. 9 is a perspective view of the modular power supply in FIG. 1 according to a different angle and a different operating condition.

With reference to the drawings, generally denoted at 1 is a modular power supply comprising a primary input portion 2 or primary circuitry operating with predetermined input parameters and an output portion 3 comprising at least two modules 4 that can be selected and positioned for modifying the power supply output parameters.

The primary input portion 2 and the output portion 3 with modules 4 can be of the conventional type. For instance, the primary input portion 2 may comprise the input protection circuit, the network filter for electromagnetic compatibility, the active circuit for correction of the power factor, the primary part of the power conversion circuit. The latter represents the danger element for the user if it is directly accessible. The output portion 3 may comprise the secondary part of the power conversion circuit (safe part) and connectors for interconnection with modules 4. The two portions 2 and 3 can be connected by a flexible printed circuit 4a.

A container 5 houses the primary input portion 2 and the output portion 3.

Advantageously, container 5 comprises a portion 6 that is not accessible and is adapted to house the primary input portion 2 separated from the output portion 3. Container 5 further comprises a cover 7 hinged on a base structure 8 of the container for access to the output potion 3. Cover 7 has an opening 7a adapted to allow access to the terminals of the output modules 4.

In accordance with a possible embodiment, shown in the accompanying drawings for example, the inaccessible portion 6 of container 5 comprises a partition 9 disposed between the primary input portion 2 and the output portion 3 for separating the two portions and inhibiting access to the primary input portion. The flexible printed circuit connecting the two portions 2 and 3 extends below the partition 9 between the inaccessible portion 6 of container 5 and the region including the output portion.

Advantageously, partition 9 comprises openings 10 for air flow, designed to cool the primary input portion 2, the secondary portion 3 and the output modules 4. These openings 10 are such disposed that they do not allow access to the primary input portion by a user, in the open position of cover 7.

In accordance with a possible embodiment, cover 7 comprises an extension 11 adapted to bear on the inaccessible portion 6 of container 5.

The inaccessible portion 6 of container 5 comprises a wrapping structure 12 and an inner structure 13 disposed inside the wrapping structure 12. The inner structure 13 comprises the partition 9. In particular, the inner structure 13 defines a housing adapted to enclose the primary input portion 2 in such a manner that it is not accessible to the user even when covers 7 is open.

In accordance with a possible embodiment shown in the figures for example, the wrapping structure 12 surrounds the inner structure 13 only partly; in particular, the wrapping structure 12 comprises at least a bottom 12a (FIG. 7) from which side walls 12b extend, said walls being adapted to cover corresponding side walls 13b of the inner structure 13. In addition, the wrapping structure 12 comprises at least one upper wall 12c that is preferably screwed to the side walls 12b and partly covers an upper wall 13c of the inner structure 13.

The upper wall 12c is fastened to the side walls 12b by vandal-proof closing systems 12d so that the user is not allowed to remove it, with consequent possible access to the primary portion that is dangerous for the electric safety.

Advantageously, extension 11 of cover 7 is designed to directly bear on a portion of the upper wall 13c of the inner structure 13.

Advantageously, the inner structure 13 can be made of plastic material and the wrapping structure 12 can be made of metal material. In particular, also the base structure 8 and cover 7 of container 5 can be made of metal material.

In accordance with a possible embodiment, for example shown in the figures, cover 7 is hinged to the base structure 8 of container 5 at a portion external to the container's overall dimensions. In other words, both cover 7 and base structure 8 have extensions denoted at 14 and 15 respectively, inside which pin 16 defining the hinged connection is housed. Preferably, these extensions are disposed on the side designed to rest on a support surface.

Alternatively, cover 7 is hinged on the base structure 8 of container 5 at a portion internal to the container's overall dimensions.

In accordance with a possible embodiment shown in the figures for example, cover 7 comprises removable means for fastening to the base structure 8, preferably threaded fastening means 17. Advantageously, the threaded fastening means 17 is arranged on the same side of container 5 relative to the hinged connection between the cover and base structure, in particular this means is disposed on the side close to that part of the base structure that is designed to rest on a support surface.

Advantageously, cover 7 is hinged on the base structure 8 at two opposite portions disposed at an end of the base structure.

The presence of an inaccessible portion suitable to house the primary input portion separated from the output portion and a cover hinged on a base structure of the container for access to the output portion allows a modular power supply to be obtained that is able to be configured by the user in a safe and easy manner. In particular, the hinge position optimises the simplicity of opening by the final user.

In addition, the container 5 is such made that the modular power supply can be easily assembled and opened by the final user. To this aim the contemplated division into a wrapping structure and an inner structure, as well as selection of different materials, appear to be advantageous.

The partition enables separation between the dangerous portion and safe portion of the power supply, while ensuring correct cooling of same due to the presence of openings.

The cover, also due to its extension, allows an effective closure of the output portion.

What is claimed is:

1. A modular power supply (1) comprising:
    a primary input portion (2) operating with predetermined input parameters, and
    an output portion (3) comprising at least two modules (4) to be selected for modifying the power supply's output parameters,
    a container (5) in which the primary input portion (2) and the output portion (3) are housed, wherein said container (5) comprises:
    an inaccessible portion (6) adapted to house the primary input portion (2) separated from the output portion (3), and
    a cover (7) hinged on a base structure (8) of the container (5) for access to the output portion (3).

2. A modular power supply (1) as claimed in claim 1, wherein the inaccessible portion (6) of the container (5) comprises a partition (9) disposed between the primary input portion (2) and the output portion (3) for separating the two portions.

3. A modular power supply (1) as claimed in claim 2, wherein the partition (9) comprises openings (10) for cooling the primary input portion and the output portion (2, 3), said cooling openings (10) being disposed in such a manner as to enable access to the primary input portion (2).

4. A modular power supply (1) as claimed in claim 2, wherein the cover (7) comprises an extension (11) suitable to bear on the inaccessible portion (6) of the container (5).

5. A modular power supply (1) as claimed in claim 2, wherein said inaccessible portion (6) of the container (5) comprises a wrapping structure (12) and an inner structure (13) inside said wrapping structure (12), wherein said inner structure (13) comprises the partition (9) and houses the primary input portion (2).

6. A modular power supply (1) as claimed in claim 5, wherein the inner structure (13) is made of a plastic material and the wrapping structure (12), the base structure (8) and cover (7) of the container (5) are made of a metallic material.

7. A modular power supply (1) as claimed in claim 1, wherein the cover (7) is hinged on the base structure (8) of the container (5) at a portion external or internal to the container's overall dimensions.

8. A modular power supply (1) as claimed in claim 1, wherein the cover is hinged to the base structure at two opposite portions disposed to one end of the base structure.

9. A modular power supply (1) as claimed in claim 1, wherein the cover (7) and the base structure (8) have extensions (14, 15) in which a pin (16) defining the hinged connection is housed.

10. A modular power supply (1) as claimed in claim 1, wherein said inaccessible portion (6) of the container (5) comprises an upper wall (12c) fixed to side walls (12b) to prevent user's access to the primary input portion (2).

11. A modular power supply (1) as claimed in claim 5 wherein the wrapping structure (12) surrounds the inner structure (13) only partly.

* * * * *